US012114360B2

(12) United States Patent
Han et al.

(10) Patent No.: US 12,114,360 B2
(45) Date of Patent: Oct. 8, 2024

(54) RESOURCE SELECTION FOR RANDOM ACCESS

(71) Applicant: QUALCOMM Incorporated, San Diego, CA (US)

(72) Inventors: Junsheng Han, Sunnyvale, CA (US); Muhammad Nazmul Islam, Littleton, MA (US); Raghu Narayan Challa, San Diego, CA (US); Mihir Vijay Laghate, San Diego, CA (US); Amir Aminzadeh Gohari, Sunnyvale, CA (US); Alexei Yurievitch Gorokhov, San Diego, CA (US)

(*) Notice: Subject to any disclaimer, the term of this patent is extended or adjusted under 35 U.S.C. 154(b) by 53 days.

(21) Appl. No.: 16/818,796

(22) Filed: Mar. 13, 2020

(65) Prior Publication Data

US 2021/0289558 A1 Sep. 16, 2021

(51) Int. Cl.
*H04W 74/0833* (2024.01)
*H04W 56/00* (2009.01)

(52) U.S. Cl.
CPC ..... *H04W 74/0833* (2013.01); *H04W 56/001* (2013.01)

(58) Field of Classification Search
CPC ........... H04W 74/0833; H04W 56/001; H04W 52/0229; H04W 52/0238; H04W 56/003; H04W 56/0015; Y02D 30/70
See application file for complete search history.

(56) References Cited

U.S. PATENT DOCUMENTS

| 2012/0163179 | A1* | 6/2012 | Jo ....................... H04B 7/15507 370/237 |
| 2014/0376466 | A1* | 12/2014 | Jeong ................ H04W 74/0833 370/329 |
| 2018/0368117 | A1* | 12/2018 | Ying ..................... H04L 1/0061 |
| 2019/0116613 | A1 | 4/2019 | Abedini et al. |
| 2020/0128588 | A1* | 4/2020 | Xiong .................. H04B 7/0617 |
| 2020/0154377 | A1* | 5/2020 | Qian .................. H04W 74/0833 |
| 2020/0187258 | A1 | 6/2020 | Lee et al. |

FOREIGN PATENT DOCUMENTS

| EP | 3829253 A1 * | 6/2021 | .......... H04B 7/0695 |
| WO | WO-2017173892 A1 * | 10/2017 | .......... H04W 74/00 |
| WO | WO-2020032618 A1 | 2/2020 | |

OTHER PUBLICATIONS

International Search Report and Written Opinion—PCT/US2021/021985—ISA/EPO—Jun. 29, 2021.

* cited by examiner

*Primary Examiner* — Ayanah S George

(57) ABSTRACT

Methods, systems, and devices for wireless communications are described. The described techniques provide for selecting a PRACH occasion (RO) based on downlink quality, access congestion, latency (e.g., time to next available RO), beam correspondence, random access in previous transmissions, or combinations of these factors. The user equipment (UE) may detect access congestion of synchronization signal blocks (SSBs) and select the less congested SSB in the RO selection. The UE may detect the access congestion by receiving a back-off indicator from the base station, detecting a contention resolution failure, or the number or media access control (MAC) subheaders in a random access response. In some cases, the ROs associated with different SSBs have different latencies and the UE may select the earliest available RO.

30 Claims, 12 Drawing Sheets

RESOURCE SELECTION FOR RANDOM ACCESS

FIELD OF TECHNOLOGY

The following relates generally to wireless communications and more specifically to resource selection for random access.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless device (e.g., a user equipment (UE)) may communicate with a base station using a random access channel (RACH) mapped to a physical random access channel (PRACH). The UE may select the time and frequency resources (e.g., PRACH occasions) for transmitting the PRACH. In some cases, the base station may fail to receive the PRACH. Thus, techniques may be desirable to improve the selection of PRACH occasions for transmitting a PRACH.

SUMMARY

The described techniques relate to improved methods, systems, devices, and apparatuses that support resource selection for random access. Generally, the described techniques provide for selecting a random access occasion (e.g., physical random access channel (PRACH) occasion (RO), which may also be referred to as a RACH occasion) based on downlink quality, access congestion, latency (e.g., time to next available RO), beam correspondence, random access in previous transmissions, or combinations of these factors. The UE may detect access congestion of synchronization signal blocks (SSBs) and select the less congested SSB in the RO selection (e.g., using a soft preference metric or a hard avoidance metric). The UE may detect the access congestion by receiving a back-off indicator from the base station, detecting a contention resolution failure, or the number or media access control (MAC) subheaders in a random access response. In some cases, the ROs associated with different SSBs have different latencies and the UE may select the earliest available RO. In other cases, the UE may select the ROs which have an associated beam per link (BPL) with the beams with corresponding quality and directionality. Additionally or alternatively, the UE may select ROs with previously selected BPLs, for example when performing power ramp up procedures on retransmissions.

A method of wireless communication at a UE is described. The method may include determining to perform a random access procedure with a base station, receiving a set of synchronization signal blocks of a set of synchronization signal blocks, where each random access occasion of a set of random access occasions corresponds to at least one synchronization signal block of the set of synchronization signal blocks, determining, for each synchronization signal block of the set of synchronization signal blocks, a received power and a value of one or more additional parameters for random access occasion selection, and transmitting, to the base station, a first message of the random access procedure in a random access occasion selected from the set of random access occasions based on the received power and the value of the one or more additional parameters.

An apparatus for wireless communication at a UE is described. The apparatus may include a processor, memory coupled with the processor, and instructions stored in the memory. The instructions may be executable by the processor to cause the apparatus to determine to perform a random access procedure with a base station, receive a set of synchronization signal blocks of a set of synchronization signal blocks, where each random access occasion of a set of random access occasions corresponds to at least one synchronization signal block of the set of synchronization signal blocks, determine, for each synchronization signal block of the set of synchronization signal blocks, a received power and a value of one or more additional parameters for random access occasion selection, and transmit, to the base station, a first message of the random access procedure in a random access occasion selected from the set of random access occasions based on the received power and the value of the one or more additional parameters.

Another apparatus for wireless communication at a UE is described. The apparatus may include means for determining to perform a random access procedure with a base station, receiving a set of synchronization signal blocks of a set of synchronization signal blocks, where each random access occasion of a set of random access occasions corresponds to at least one synchronization signal block of the set of synchronization signal blocks, determining, for each synchronization signal block of the set of synchronization signal blocks, a received power and a value of one or more additional parameters for random access occasion selection, and transmitting, to the base station, a first message of the random access procedure in a random access occasion selected from the set of random access occasions based on the received power and the value of the one or more additional parameters.

A non-transitory computer-readable medium storing code for wireless communication at a UE is described. The code may include instructions executable by a processor to determine to perform a random access procedure with a base station, receive a set of synchronization signal blocks of a set of synchronization signal blocks, where each random access occasion of a set of random access occasions corresponds to at least one synchronization signal block of the set of synchronization signal blocks, determine, for each synchronization signal block of the set of synchronization signal blocks, a received power and a value of one or more additional parameters for random access occasion selection, and transmit, to the base station, a first message of the random access procedure in a random access occasion selected from the set of random access occasions based on the received power and the value of the one or more additional parameters.

In some examples of the method, apparatuses, and non-transitory computer-readable medium described herein, the one of more additional parameters may include operations, features, means, or instructions for selecting, based on the received power and the value of the congestion parameter associated with a synchronization signal block of the set of synchronization signal blocks, the random access occasion corresponding to the synchronization signal block.

In some examples of the method, apparatuses, and non-transitory computer-readable medium described herein, selecting the random access occasion based on the received power and the value of the congestion parameter may include operations, features, means, or instructions for determining the value of the congestion parameter based on a backoff indication, a number of contention resolution failures, a number of media access control subheaders, or a combination thereof, and selecting the random access occasion based on the received power and the value of the congestion parameter.

In some examples of the method, apparatuses, and non-transitory computer-readable medium described herein, selecting the random access occasion corresponding to the synchronization signal block may include operations, features, means, or instructions for determining that the received power reduced by the value of the congestion parameter for the synchronization signal block may be greater than each other received power reduced by a corresponding value of the congestion parameter for each other synchronization signal block of the set of synchronization signal blocks.

In some examples of the method, apparatuses, and non-transitory computer-readable medium described herein, selecting the random access occasion corresponding to the synchronization signal block may include operations, features, means, or instructions for identifying, for each synchronization signal block of the set of synchronization signal blocks, a selection probability value based on the received power and the value of the congestion parameter, and selecting the random access occasion corresponding to the synchronization signal block based on the selection probability value corresponding to the synchronization signal block.

In some examples of the method, apparatuses, and non-transitory computer-readable medium described herein, selecting the random access occasion corresponding to the synchronization signal block may include operations, features, means, or instructions for identifying that a value of the congestion parameter associated with at least one synchronization signal block of the set of synchronization signal blocks may have exceeded a threshold value associated with a backoff indication, a number of contention resolution failures, or a combination thereof, and excluding the at least one synchronization signal block from selection by the UE based on the identifying.

In some examples of the method, apparatuses, and non-transitory computer-readable medium described herein, the one of more additional parameters may include operations, features, means, or instructions for selecting, based on the received power and the value of the timing parameter associated with the random access occasion corresponding to the synchronization signal block, the random access occasion corresponding to the synchronization signal block.

In some examples of the method, apparatuses, and non-transitory computer-readable medium described herein, selecting the random access occasion corresponding to the synchronization signal block may include operations, features, means, or instructions for excluding at least one random access occasion of the set of random access occasions based on determining that the at least one random access occasion exceeds a latency threshold for the timing parameter.

In some examples of the method, apparatuses, and non-transitory computer-readable medium described herein, selecting the random access occasion corresponding to the synchronization signal block may include operations, features, means, or instructions for determining two or more synchronization signal blocks of the set of synchronization signal blocks associated with a received power that satisfies a received power threshold, identifying two or more random access occasions corresponding to the two or more synchronization signal blocks, and selecting the random access occasion from the two or more random access occasions based on the random access occasion being closest in time, the value of the timing parameter corresponding to the random access occasion being the closest in time.

In some examples of the method, apparatuses, and non-transitory computer-readable medium described herein, the one of more additional parameters may include operations, features, means, or instructions for selecting, based on the received power and the value of the beam correspondence parameter associated with the random access occasion corresponding to the synchronization signal block, the random access occasion corresponding to the synchronization signal block.

Some examples of the method, apparatuses, and non-transitory computer-readable medium described herein may further include operations, features, means, or instructions for excluding at least one synchronization signal block of the set of synchronization signal blocks from selection by the UE based on identifying that the UE previously failed to receive a random access response from the base station using a beam pair link associated with the least one synchronization signal block.

In some examples of the method, apparatuses, and non-transitory computer-readable medium described herein, selecting the random access occasion corresponding to the synchronization signal block may include operations, features, means, or instructions for determining that the value of the beam correspondence parameter for the synchronization signal block corresponding to the random access occasion exceeds each other value of the beam correspondence parameter for each other synchronization signal block of the set of synchronization signal blocks.

In some examples of the method, apparatuses, and non-transitory computer-readable medium described herein, the one of more additional parameters may include operations, features, means, or instructions for selecting the random access occasion corresponding to a synchronization signal block of the set of synchronization signal blocks based on the received power and the value of a beam pair link history parameter associated with the synchronization signal block.

In some examples of the method, apparatuses, and non-transitory computer-readable medium described herein, the beam pair link history parameter indicates that the synchronization signal block may be associated with a beam pair link previously established between the UE and the base station.

In some examples of the method, apparatuses, and non-transitory computer-readable medium described herein, the beam pair link history parameter indicates that the synchronization signal block may be associated with a beam pair link that may have failed fewer than a threshold number of times.

In some examples of the method, apparatuses, and non-transitory computer-readable medium described herein, the one of more additional parameters include a congestion parameter, a latency parameter, a beam correspondence parameter, a beam pair link history parameter, or a combination thereof.

In some examples of the method, apparatuses, and non-transitory computer-readable medium described herein, the first message of the random access procedure may include operations, features, means, or instructions for monitoring, on a received beam that may be based on the random access occasion selected to transmit the first message of the random access procedure, for a message 2 of the four-step random access procedure or for a message B of the two-step random access procedure.

DETAILED DESCRIPTION

Figure 1:
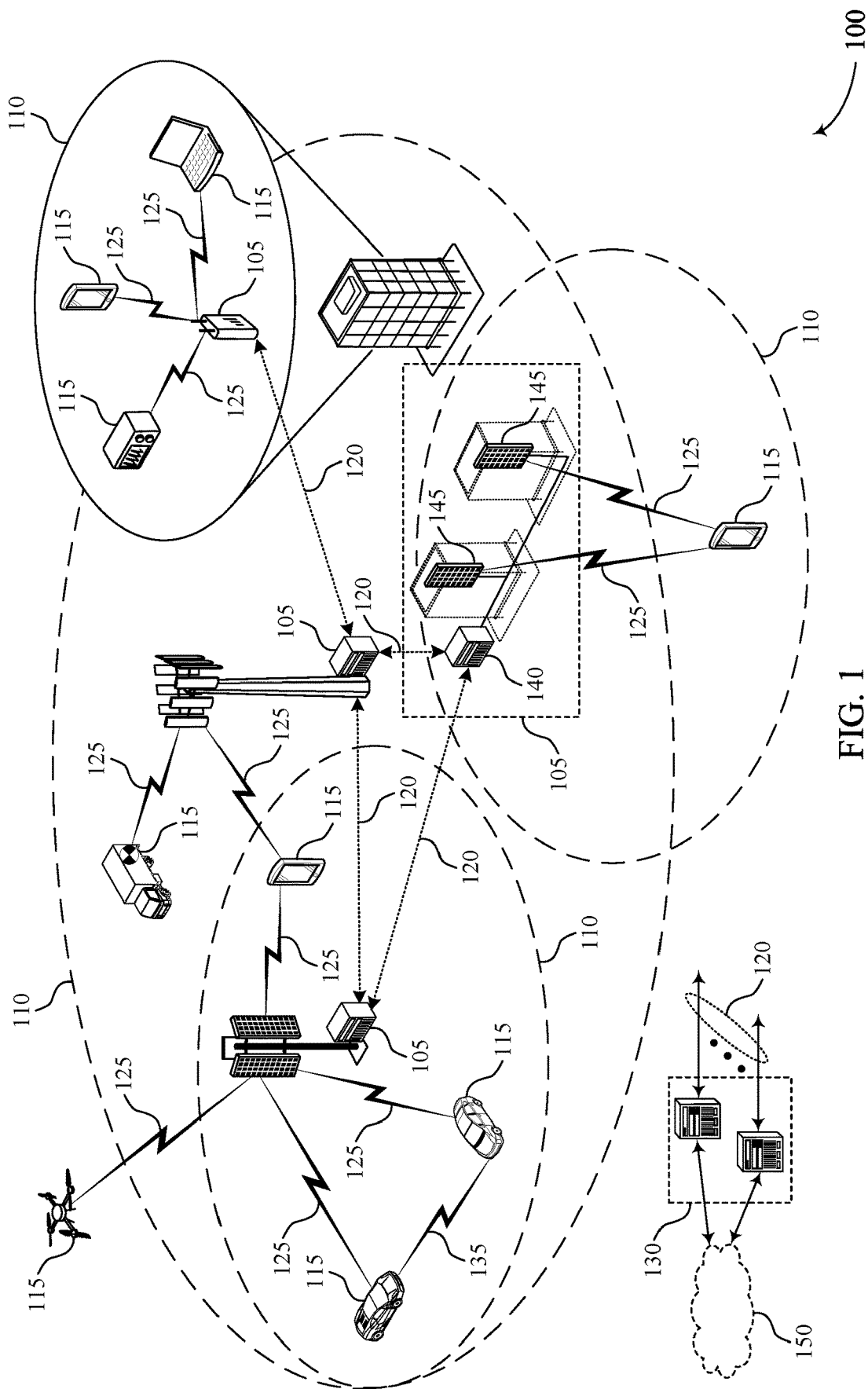
FIG. 1 illustrates an example of a system for wireless communications that supports resource selection for random access in accordance with aspects of the present disclosure.

A UE may communicate with a base station using a random access channel (RACH) mapped to a physical random access channel (PRACH). The UE may select the time and frequency resources and RACH preamble index for transmitting the PRACH. A PRACH occasion (RO) (e.g., which may also be referred to as a RACH occasion) may be defined as time and frequency resources on which the UE may transmit, on a respective directional beam, a random access message in a random access procedure, such as a first message of a random access procedure (e.g., message 1 of a four-step random access procedure or message A of a two-step random access procedure) using a configured PRACH preamble format. The resources for PRACH occasion (ROs) may be configured via the system information block (SIB) and/or radio resource control (RRC) signaling.

The UE may determine the initial beam per link (BPL) between the base station and the UE by measuring the strongest reference signal received power (RSRP) from a synchronization signal block (SSB) and selecting the associated RO on which to transmit the PRACH. In some examples, the UE may select a RO to retransmit message 1 of the four-step random access procedure (e.g., if the UE does not receive a message 2 during a random access response window) using power ramping procedures, however if the UE and base station switch BPLs (e.g., due to access congestion or transmission/receive beam non-correspondence) the power ramping may not be effective. In other examples, the RO configuration mapping may come in a semi periodic fashion which may cause latency issues (e.g., the base station may instruct the UE to wait to select a suitable RO in terms of uplink/downlink quality.

The UE may select a RO based on downlink quality, access congestion, latency (e.g., time to next available RO), beam correspondence, or random access in previous PRACH transmissions. The UE may detect access congestion of SSBs and select the least congested SSB in the RO selection. The UE may detect the access congestion by receiving a back-off indicator from the base station. The back-off indicator may indicate a large number of UEs are concentrated in an area of a cell, and even if the UE implements power ramping, the UE may have better communication success by selecting a different BPL with a less congested path.

In some cases, the ROs associated with different SSBs have different latencies and the UE may select the earliest available RO. The base station may send the RO configuration to the UE in a semi-periodic fashion and the UE may have to wait (e.g., up to 160 ms) for the RO to be configured. Therefore, rather than waiting, the UE may switch to another SSB and associated RO.

In other cases, the UE may select the ROs which have an associated BPL with beams with corresponding quality and directionality. The UE may determine if there is a non-correspondence between the transmission and reception beam based on an offline characterization of the spherical coverage or by online detection. After the determination, the UE may select a RO which has the least pathloss with a transmission beam. In another case, the UE may select ROs with previously selected BPLs when performing power ramp up procedures on retransmissions. Remaining with the previously selected BPL during power ramping procedures, may increase the chance of the base station detecting the UE when the base station receives a stronger signal.

As described herein, the first message of the random access message may be a message 1 of a four-step random access procedure or a message A of a two-step random access procedure. Where an example is described as applicable to a message 1 such example may also be applicable to a message A, and vice versa. Moreover, when an example is described as applicable to a message 2 of a four-step random access procedure, such example may also be applicable to a message B of a two-step random access procedure, and vice versa.

Aspects of the disclosure are initially described in the context of a wireless communications system. Additionally, aspects of the disclosure are illustrated through an additional wireless communications system, examples of RO selection and a process flow. Aspects of the disclosure are further illustrated by and described with reference to apparatus diagrams, system diagrams, and flowcharts that relate to techniques for selecting ROs.

FIG. 1 illustrates an example of a wireless communications system 100 that supports resource selection for random access in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, such as in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may seek to acquire time and frequency synchronization with a base station 105 (e.g., a cell) and to detect Physical layer Cell ID (PCI) of the cell. A UE 115, when it is powered ON, during mobility in connected mode, during idle mode mobility (e.g. cell selection or reselections), inter-RAT mobility, or otherwise during a random access procedure, may monitor for SSBs from a base station 105. For example, a UE 115 may tune to the frequency of a cell and then attempt to receive and decode one or more of the SSBs that may be transmitted by a base station (e.g., the cell). In some examples, SSBs may be beam swept using one or more beamforming techniques. Each SSB may include a primary synchronization signal (PSS) (e.g., in a first symbol period of the SSB), a secondary synchronization signal (SSS) (e.g., in a third symbol period of the SSB), a physical broadcast channel (PBCH) (e.g., in the a second, third, and fourth symbol of the SSB), and a demodulation reference signal (DMRS) for the PBCH. The UE 115 may use the NR synchronization signals (e.g., PSS and SSS) and PBCH to derive the information that UE 115 uses to access the cell.

In some examples, the UE 115 performing a random access procedure may include the UE 115 receiving a random access configuration (e.g., from a base station 105). In some examples, the random access configuration may indicate time and frequency resources for ROs (the term RO may be used interchangeably with RACH occasion or PRACH occasion herein) for the UE to use to transmit a random access preamble. In some examples, the random access configuration may indicate how many ROs are allocated in a frequency domain and/or how many ROs are allocated in a time domain.

In some wireless communications systems, a UE 115 may determine whether to utilize a two-step random access procedure or a four-step random access procedure. If performing two-step RACH, the UE may transmit a preamble (e.g., RACH preamble) and a payload (e.g., RACH payload), which together may be referred to as a message A (MsgA), before receiving a random access response (RAR) from the base station. If performing four-step RACH, the UE may transmit the RACH preamble, referred to as a message 1 (Msg1), before receiving the RAR (e.g., in the first two steps of the four-step random access procedure). The UE may then transmit a message 3 (Msg3), which may be an example of an uplink data payload, and may receive a message 4 (Msg4) from the base station in response. The UE may use the random access procedure to gain uplink synchronization with the base station and to obtain resources for transmitting a random access payload, such as a RRC connection request. In some cases, where a UE 115 (e.g., a high capability UE) has the ability to utilize multiple antennas, higher transmit/receive bandwidths, etc., the UE 115 may utilize the four-step random access procedure as it may be more robust than the two-step random access procedure.

Wireless devices operating in licensed or unlicensed spectrum within an NR network may participate in a two-step random access procedure or a four-step random access procedure to establish an initial connection or to re-establish a connection with a base station 105. The two-step random access procedure may decrease the time it takes for the UE 115 and base station 105 to establish a connection as compared to a four-step random access procedure. For example, when the UE 115 is performing listen-before-talk (LBT) procedures in associations with the random access procedure, the two-step random access procedure may reduce delay in establishing a connection due to the decreased number of LBT procedures associated with the two-step random access procedure. In some cases, a four-step RACH procedure may increase the chances that the UE 115 is able to successfully establish a communication link 125 with the base station 105, for example if signal quality is poor.

In some examples, the UE 115 may select a RO based on downlink quality, access congestion, latency (e.g., time to next available RO), beam correspondence, random access in previous transmissions, or combinations of these factors. The UE 115 may detect access congestion of SSBs and select the less congested SSB in the RO selection (e.g., using a soft preference metric or a hard avoidance metric). The UE 115 may detect the access congestion by receiving a back-off indicator from the base station, detecting a contention resolution failure, or the number or MAC subheaders in a random access response. In some cases, the ROs associated with different SSBs have different latencies and the UE 115 may select the earliest available RO. In other cases, the UE 115 may select the ROs which have an associated BPL with the beams with corresponding quality and directionality. Additionally or alternatively, the UE 115 may select ROs with previously selected BPLs, for example when performing power ramp up procedures on retransmissions.

Figure 2:
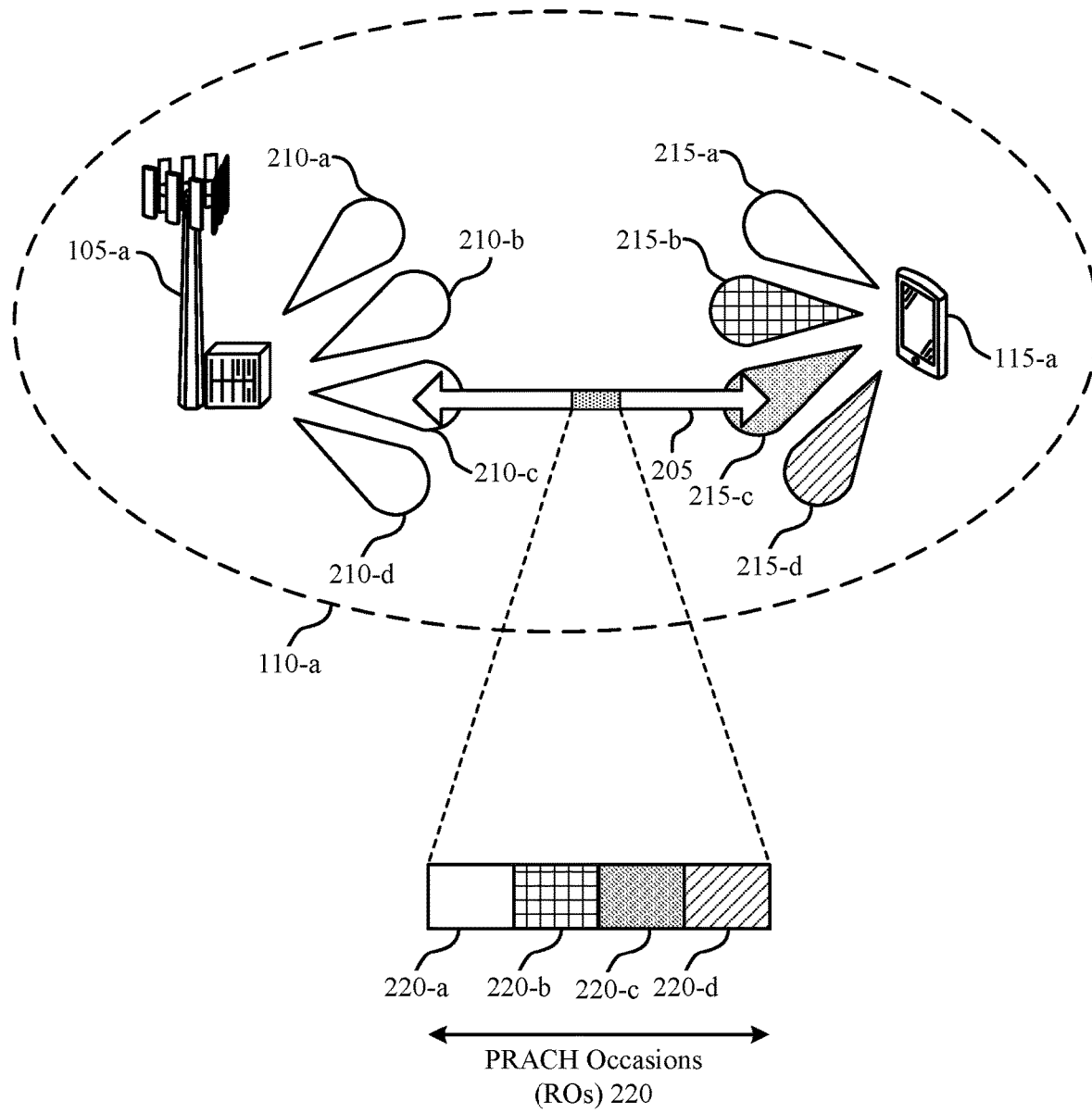
FIG. 2 illustrates an example of a wireless communications system that supports resource selection for random access in accordance with aspects of the present disclosure.

FIG. 2 illustrates an example of a wireless communications system 200 that supports resource selection for random access in accordance with aspects of the present disclosure. In some examples, wireless communications system 200 may implement aspects of wireless communications system 100. Wireless communications system 200 may include a base station 105-*a* and a UE 115-*a*, which may be examples of corresponding base stations 105 and UEs 115, respectively, as described herein with reference to FIG. 1. In some cases, UE 115-*a* and base station 105-*a* may communicate on resources of a communication link 205 (e.g., a channel, a beam, a beam pair link (BPL), PRACH etc.). Additionally, the communications on communication link 205 may be performed via beamformed transmissions as described herein with reference to FIG. 1.

Base station 105-*a* may provide network coverage for geographic area 110-*a*. Base station 105-*a* and UE 115-*a* may communicate using beamformed or directional transmissions, and non-beamformed transmissions. For example, in downlink communications, base station 105-*a* may transmit downlink transmissions to UE 115-*a* using a beamformed downlink transmission beam 210, which may be one of a number of downlink transmission beams used by the base station 105-*a*, such as downlink transmission beams 210-*a*, 210-*b*, 210-*c*, and 210-*d*. UE 115-*a* may transmit uplink transmissions to the base station 105-*a* using a beamformed uplink transmission beam 215, which may be one of a number of uplink transmission beams used by the UE 115-*a*, such as uplink transmission beams 215-*a*, 215-*b*, 215-*c*, and 215-*d*.

In some cases, the base station 105-*a* may transmit SSBs via downlink transmission beams 210. Uplink transmission beams 215 of the UE 115-*a* may be linked with downlink transmission beams 210. In some cases, each corresponding pair of transmit beams may be referred to as a BPL, and the UE 115-*a* and the base station 105-*a* may configure BPLs and switching between configured BPLs may be performed based on channel conditions. In some cases, beamformed transmissions may switch BPLs relatively quickly, such as in cases where the UE 115-*a* is moving quickly relative to the base station 105-*a* (e.g., where the UE 115-*a* is on, in, or a part of a car, train, or other vehicle), or in cases where temporary interference sources may impact a transmission beam (e.g., a user of UE 115-*a* may move their hand such that an antenna panel at the UE 115-*a* is blocked, or a vehicle or piece of machinery may move into a beam path of a transmission beam). UE 115-*a* may monitor downlink transmission beams 210 from base station 105-*a* to determine the best BPL on which to communicate with UE 115 *a*, where the BPL includes a downlink transmission beam 210 and an uplink transmission beam 215 that follow the same path (e.g., BPL may include downlink transmission beam 210-*c* from base station 105-*a* and uplink transmission beam 215-*c* from UE 115-*a*). The best BPL may be the BPL that features the highest received power or quality, for example the highest reference signal received quality (RSRQ), received signal strength indicator (RSSI), reference signal received power (RSRP), signal-to-interference-plus-noise ratio (SINR), or signal-to-noise ratio (SNR), etc., compared to the other BPLs.

UE 115-*a* may select an RO 220, such as ROs 220-*a*, 220-*b*, 220-*c*, and 220-*d*, to transmit a PRACH on communication link 205 in the BPL between UE 115-*a* and base station 105-*a*. The selected RO 220 (e.g., RO 220-*c*) may be associated with an SSB or other reference signals transmitted by the base station 105-*a*. UE 115-*a* may select RO 220-*c* based on the measuring the strongest signal strength or quality (e.g., RSRP) from downlink transmission beam 210-*c*. For example, UE 115-*a* may measure and determine that the strongest signal from an SSB is from downlink transmission beam 210-*c*, and then select the corresponding RO 220-*c* in uplink transmission beam 215-*c* on which to transmit a PRACH.

In some examples, base station 105-*a* may fail to receive a PRACH from UE 115-*a* due to access congestion (e.g., low signal to noise ratio (SNR), high interference from other UEs, signal collisions from other UEs attempting to access ROs associated with the same SSB, etc.). In contention based random access, preambles and ROs of PRACH transmissions from multiple UEs may collide. Access congestion may occur when multiple UEs, in close proximity in a coverage area of a base station, attempt to access ROs associated with the same SSB.

UE 115-*a* may detect access congestion and select an RO with a less congested SSB. UE 115-*a* may detect the access congestion by receiving a back-off indicator from base station 105-*a*. Base station 105-*a* may detect multiple UEs causing the access congestion, and send the back-off indicator (e.g., beam specific indicator) to UE 115-a, indicating UE 115-a should wait for an amount of time before attempting to access the congested SSB. In some examples, UE 115-a may detect access congestion by a failure, or multiple failures (e.g., based on matching or exceeding a threshold number of failures), of contention resolution or by a number of MAC subheaders with random access preamble identifier (RAPID) and random access response (RAR).

In some cases, UE 115-a may select an RO associated with a less congested SSB by a soft preference method. For example, UE 115-a may derive a congestion metric (e.g., a congestion parameter) based on the back-off indicator, a number of contention resolution failures, or a number of MAC subheaders. UE 115-a may use the congestion metric in relation to the RO selection metric (e.g., based on RSRP) or other selection metrics to determine the probability of selecting an RO. UE 115-a may determine (e.g., based on a beam UE 115-a selects) a threshold (e.g., a received power threshold, such as an RSRP threshold, or a received quality threshold, such as an RSRQ) and select an RO which satisfies the threshold. In some examples, a base station, such as base station 105-a or another base station 105, may have configured the UE 115-a with the threshold, and the UE 115-a may identify such threshold for use in selecting the RO.

In other cases, UE 115-a may select an RO associated with a less congested SSB by a hard avoidance method. UE 115-a may determine a threshold based on the back-off indicator, the number of contention resolution failures, or the number of MAC subheaders. When an SSB exceeds the threshold, UE 115-a may avoid the SSB and associated ROs.

In some examples, base station 105-a may transmit SSBs according to a periodicity which is different than the RO configuration period (e.g., up to 20 ms) of the ROs 220 associated with corresponding SSBs. For example, the ROs and SSBs association mapping may repeat up to every 160 ms and base station 105-a may instruct UE 115-a to wait for a suitable RO 220, in terms of uplink and downlink quality, to be available. UE 115-a may use the latency information (e.g., a timing parameter) of SSBs when selecting an RO 220. For example, UE 115-a may not select ROs 220 corresponding to SSBs which are available outside of a threshold amount of time. UE 115-a may switch BPLs to receive another SSB which corresponds to an RO 220 the UE 115-a may access sooner. UE 115-a may select the earliest available RO 220 based an RO selection metric which may be a function of RO latency or RSRP (e.g., associated reference signals within threshold, such as a dB threshold)

In some examples, for random access, UE 115-b may measure a downlink transmission from base station 105-a and select an RO to send a PRACH on an uplink transmission based on the downlink. However this relies on the transmission and receive beams of UE 115-a to be correspondent. A beam (e.g., uplink transmission beam 215-c) may include a main lobe and side lobes. Uplink transmission beam 215-c and downlink transmission beam 210-c may form a BPL. The main lobes and side lobes in beams 215-c and 210-c may be may not be aligned. For example, a user of UE 115-a may move their hand such that an antenna panel at the UE 115-a is blocked, such as due to the limited number of antenna arrays placed on UE 115-a there may be times when the best reception of an SSB is through a side lobe. When the side lobes of beams 215-c and 210-c are not aligned, the side lobes may not correspond in directionality and there may be a disconnect between uplink and downlink quality. Additionally or alternatively, maximum permissible exposure (MPE) may cause asymmetry between downlink and uplink quality. UE 115-a may measure a high quality downlink transmission on a downlink beam however the corresponding uplink beam may have severe limitation in uplink quality because transmission in that uplink beam may cause higher exposure to humans than transmitting on other antenna arrays or beams.

UE 115-a may select an RO with an associated BPL with beam correspondence (e.g., a beam correspondence parameter). UE 115-a may determine if there is non-correspondence between uplink and downlink beams based on offline characterization of spherical coverage or online detection (e.g., after power ramping fails to receive an RAR with the correct RAPID, or not receiving a response after sending message 1 of the four step random access procedure or message A of a two-step random access procedure may indicate a difference in directionality of beams). UE 115-a may determine the corresponding RO and associated beam implementing the soft preference or hard avoidance metrics as described herein. UE 115-a may switch ROs and associated SSBs in a PRACH retransmission after determining a corresponding BPL.

In some examples, UE 115-a may not increment power ramping when selecting a different BPL for retransmitting the random access channel (RACH) preamble (e.g., such as a message 1 of a four-step random access procedure). The PRACH received power at base station 105-a may remain constant if UE 115-a selects a different BPL. UE 115-a may give preference to a previously selected BPL (e.g., a BPL history parameter) or SSB when retransmitting a PRACH. Maintaining the previously selected BPL may allow UE 115-a to power ramp up and obtain a successful communication with base station 105-a. When UE 115-a power ramps on a previously selected BPL, the SNR may increase, pathloss may be reduced, and there may be a higher chance of being heard by base station 105-a. If UE 115-a were to switch to a stronger BPL, base station 105-a may not detect the retransmission of the PRACH because there may not be an increase in power from the same BPL. UE 115-a may determine to maintain the previously selected BPL by implementing hysteresis, the soft preference or hard avoidance metrics as described herein.

In some examples, UE 115-a may switch to another BPL if transmission failure occurs after power ramping on a previously selected BPL for a threshold number of retransmissions or a threshold amount (e.g., a configured or preconfigured value in dB) of power is expensed. UE 115-a may switch to another BPL if the associated SSB is less congested or the SSB associated with the previously selected BPL is supported by side lobe coverage of a beam.

Figure 3:
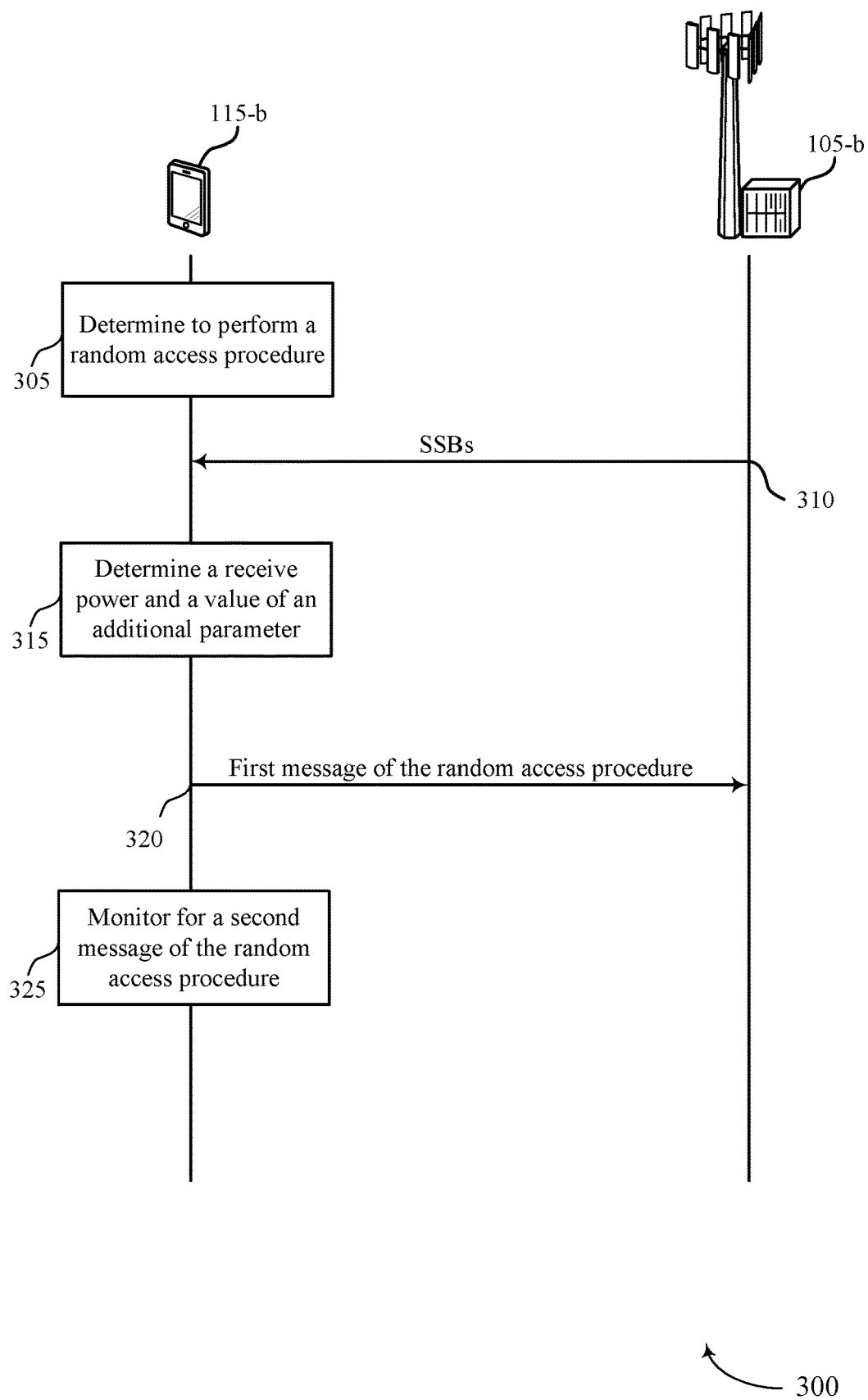
FIG. 3 illustrates an example of a process flow that supports resource selection for random access in accordance with aspects of the present disclosure.

FIG. 3 illustrates an example of a process flow 300 that supports resource selection for random access in accordance with aspects of the present disclosure. In some examples, process flow 300 may implement aspects of wireless communication system 100. Process flow 300 may include a base station 105-b and a UE 115-b, which may be examples of corresponding base stations 105 and UEs 115, respectively, as described herein with reference to FIG. 1, or of corresponding base stations 105-a and UE 115-a, respectively, as described herein with reference to FIG. 2.

At 305, UE 115-b may determine to perform a random access procedure (e.g., PRACH or RACH procedure) with a base station. In some examples, the random access procedure may be a four-step random access procedure. In other examples, the random access procedure may be a four-step random access procedure. In yet other examples, the random access procedure may be another type of random access procedure that performs at least process flow 300 as part of the random access procedure.

At 310, UE 115-b may receive a plurality of SSBs of a set of SSBs from base station 105-b, wherein each random access occasion (e.g., RO) of a set of random access occasions (e.g., a set of ROs, which may include multiple ROs) corresponds to at least one SSB of the set of SSBs.

At 315, UE 115-b may determine, for each SSB of the plurality of SSBs, a received power and a value of one or more additional parameters for random access occasion selection. The one of more additional parameters may include a congestion parameter, a latency parameter, a beam correspondence parameter, or a BPL history parameter. The UE 115-b determining, for each SSB, a received power and a value of one or more additional parameters for random access occasion selection may improve the selection of ROs for transmitting a first message (e.g., message 1 or message A) of the random access procedure (e.g., four-step or two-step random access procedure), increases reliability and reduces latency. For a UE 115-b, including for a chip of the UE 115-b (e.g., a processor and/or memory), such determining may increase reliability, reduce processing power, decrease signaling overhead, promote network efficiencies, among other benefits.

In some examples, the one of more additional parameters includes a congestion parameter for the SSB. UE 115-b may select, based on the received power and the value of the congestion parameter associated with the SSB of the plurality of SSBs, the random access occasion corresponding to the SSB. UE 115-b may determine the value of the congestion parameter based on a backoff indication, a number of contention resolution failures, a number of media access control subheaders, or a combination thereof. In some cases, UE 115-b may determine that the received power reduced by the value of the congestion parameter for the SSB is greater than each other received power reduced by a corresponding value of the congestion parameter for each other SSB of the plurality of SSBs. In other cases, UE 115-b may identify, for each SSB of the plurality of SSBs, a selection probability value based on the received power and the value of the congestion parameter and may select the random access occasion corresponding to the SSB based on the selection probability value corresponding to the SSB.

UE 115-b may identify that a value of the congestion parameter associated with one or more SSBs of the plurality of SSBs has exceeded a threshold value associated with a backoff indication, a number of contention resolution failures, or a combination thereof. UE 115-b may exclude the one or more SSBs from selection by the UE 115-b based on the identifying. Particular implementations of the subject matter described herein can be implemented to realize one or more potential advantages. The UE 115-b selecting, based on the received power and the value of the congestion parameter associated with an SSB of a plurality of SSBs, the RO corresponding to the SSB may improve the selection of ROs for transmitting a PRACH, increase reliability and reduce latency. For a chip of the UE 115-b (e.g., a processor and/or memory) such selecting may increase reliability, reduce processing power, decrease signaling overhead, promote network efficiencies, among other benefits.

In some examples, the one of more additional parameters includes a timing parameter. UE 115-b may select, based on the received power and the value of the timing parameter associated with the random access occasion corresponding to the SSB, the random access occasion corresponding to the SSB. UE 115-b may exclude at least one random access occasion of the set of random access occasions based on determining that the at least one random access occasion exceeds a latency threshold for the timing parameter. In some cases, UE 115-b may determine two or more SSBs of the plurality of SSBs associated with a received power value that satisfies a received power threshold and identify two or more random access occasions corresponding to the two or more SSBs. UE 115-b may select the random access occasion from the two or more random access occasions based on the random access occasion being closest in time, the value of the timing parameter corresponding to the random access occasion being the closest in time. The UE 115-b selecting, based on the received power and the value of the timing parameter associated with the random access occasion corresponding to the SSB, the random access occasion corresponding to the SSB may improve the selection of ROs for transmitting a PRACH, increases reliability and reduces latency. For a chip of the UE 115-b (e.g., a processor and/or memory) such selecting may increase reliability, reduce processing power, decrease signaling overhead, promote network efficiencies, among other benefits.

In some examples, one of more additional parameters includes a beam correspondence parameter. UE 115-b may select, based on the received power and the value of the beam correspondence parameter associated with the random access occasion corresponding to the SSB, the random access occasion corresponding to the SSB. UE 115-b may exclude one or more SSBs of the plurality of SSBs from selection by the UE based on identifying that the UE 115-b previously failed to receive a random access response from the base station using a BPL associated with the one or more SSBs. In some cases, UE 115-b may determine that the value of the beam correspondence parameter for the SSB corresponding to the random access occasion exceeds each other value of the beam correspondence parameter for each other SSB of the plurality of SSBs. The UE 115-b may select, based on the received power and the value of the beam correspondence parameter associated with the random access occasion corresponding to the SSB. Selecting the random access occasion corresponding to the SSB may improve the selection of ROs for transmitting a PRACH, and increase reliability and reduce latency. For a chip of the UE 115-b (e.g., a processor and/or memory) such selecting may increase reliability, reduce processing power, decrease signaling overhead, promote network efficiencies, among other benefits.

In some examples, the one of more additional parameters includes a BPL history parameter for the SSB. UE 115-b may select the random access occasion corresponding to the SSB of the plurality of SSBs based on the received power and the value of the BPL history parameter associated with the SSB. In some cases, the BPL history parameter indicates that the SSB is associated with a BPL previously established between the UE 115-b and the base station 105-b. In other cases, the BPL history parameter indicates that the SSB is associated with a BPL that has failed fewer than a threshold number of times. The UE 115-b may select the random access occasion corresponding to the SSB of the plurality of SSBs based on the received power and the value of the BPL history parameter associated with the SSB. Selecting the random access occasion corresponding to the SSB may improve the selection of ROs for transmitting a PRACH, increase reliability and reduce latency. For a chip of the UE 115-b (e.g., a processor and/or memory) such selecting may increase reliability, reduce processing power, decrease signaling overhead, promote network efficiencies, among other benefits.

At 320, UE 115-*b* may transmit, to the base station 105-*b*, a first message (e.g., including at least a random access preamble) of the random access procedure in a random access occasion selected from the set of random access occasions based on the received power and the value of the one or more additional parameters. In some examples, the first message of the random access procedure includes a message 1 of a four-step random access procedure or a message A of a two-step random access procedure.

At 325, UE 115-*b* may monitor, on a received beam that is based on the random access occasion selected to transmit the first message of the random access procedure, for a message 2 of the four-step random access procedure or for a message B of the two-step random access procedure.

Figure 4:
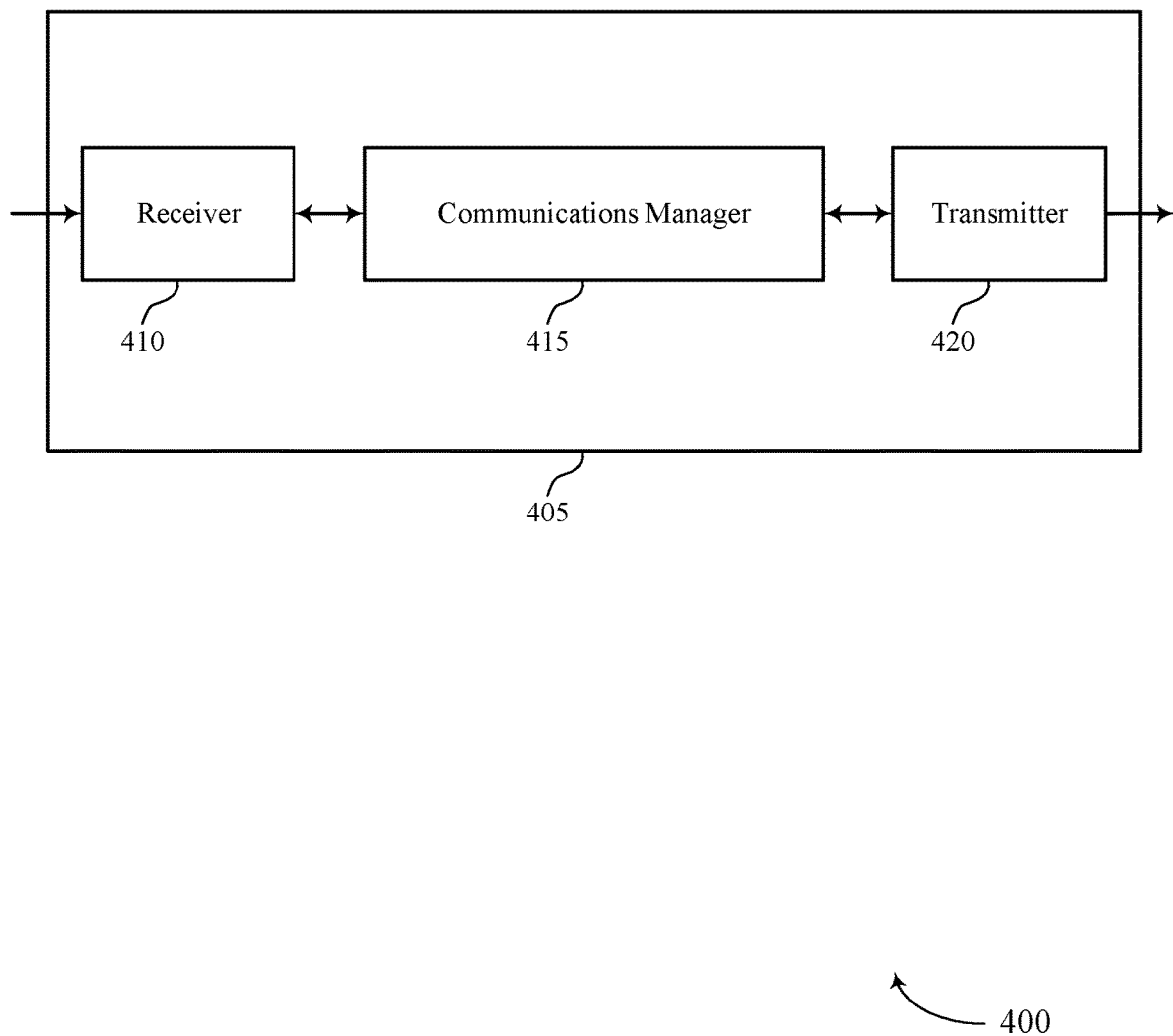
FIGS. 4 and 5 show block diagrams of devices that support resource selection for random access in accordance with aspects of the present disclosure.

FIG. 4 shows a block diagram 400 of a device 405 that supports resource selection for random access in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to resource selection for random access, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may determine to perform a random access procedure with a base station, receive a set of synchronization signal blocks of a set of synchronization signal blocks, where each random access occasion of a set of random access occasions corresponds to at least one synchronization signal block of the set of synchronization signal blocks, determine, for each synchronization signal block of the set of synchronization signal blocks, a received power and a value of one or more additional parameters for random access occasion selection, and transmit, to the base station, a first message of the random access procedure in a random access occasion selected from the set of random access occasions based on the received power and the value of the one or more additional parameters. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
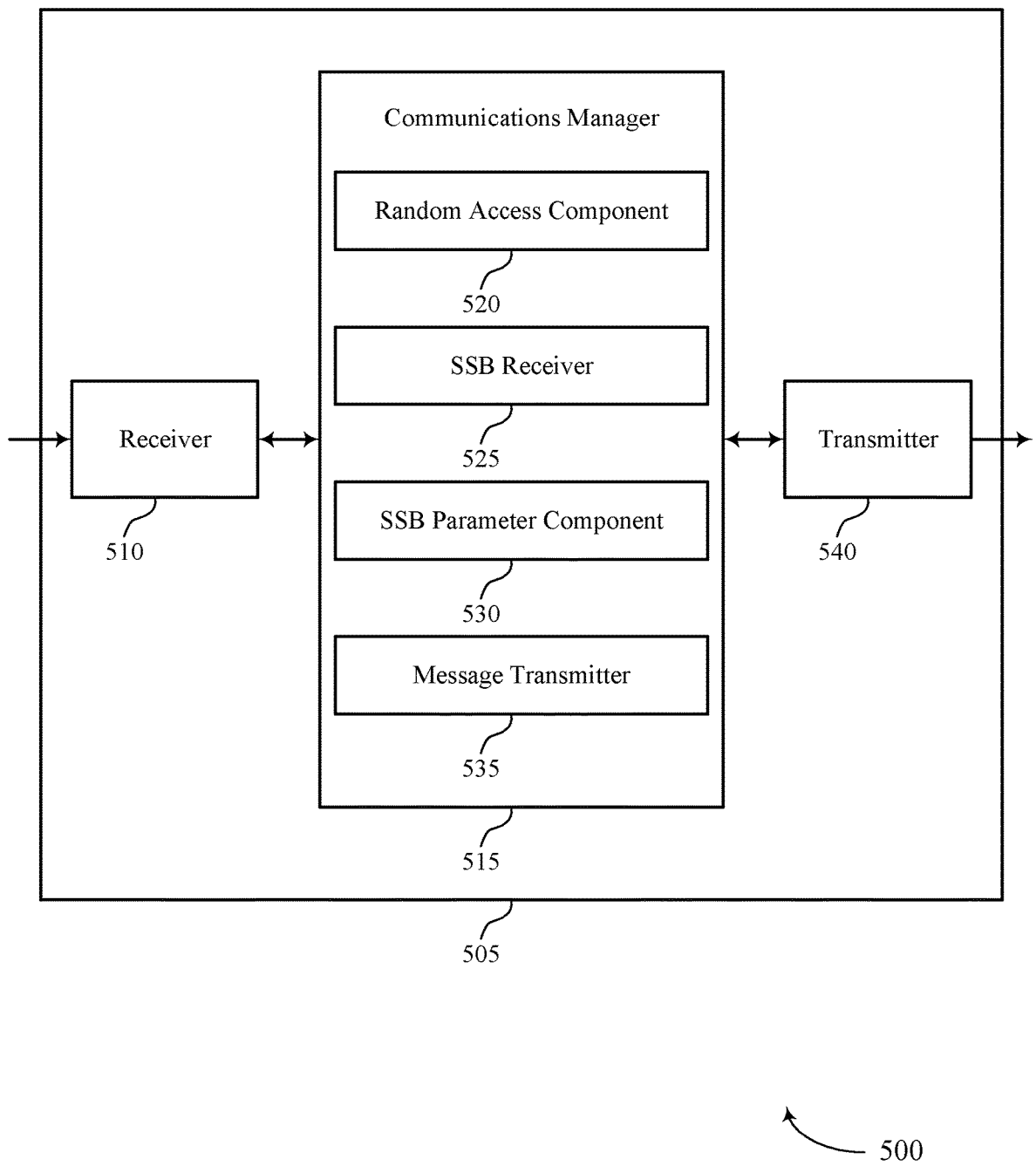

FIG. 5 shows a block diagram 500 of a device 505 that supports resource selection for random access in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to resource selection for random access, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a random access component 520, a SSB receiver 525, a SSB parameter component 530, and a message transmitter 535. The communications manager 515 may be an example of aspects of the communications manager 710 described herein.

The random access component 520 may determine to perform a random access procedure with a base station.

The SSB receiver 525 may receive a set of synchronization signal blocks of a set of synchronization signal blocks, where each random access occasion of a set of random access occasions corresponds to at least one synchronization signal block of the set of synchronization signal blocks.

The SSB parameter component 530 may determine, for each synchronization signal block of the set of synchronization signal blocks, a received power and a value of one or more additional parameters for random access occasion selection.

The message transmitter 535 may transmit, to the base station, a first message of the random access procedure in a random access occasion selected from the set of random access occasions based on the received power and the value of the one or more additional parameters.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
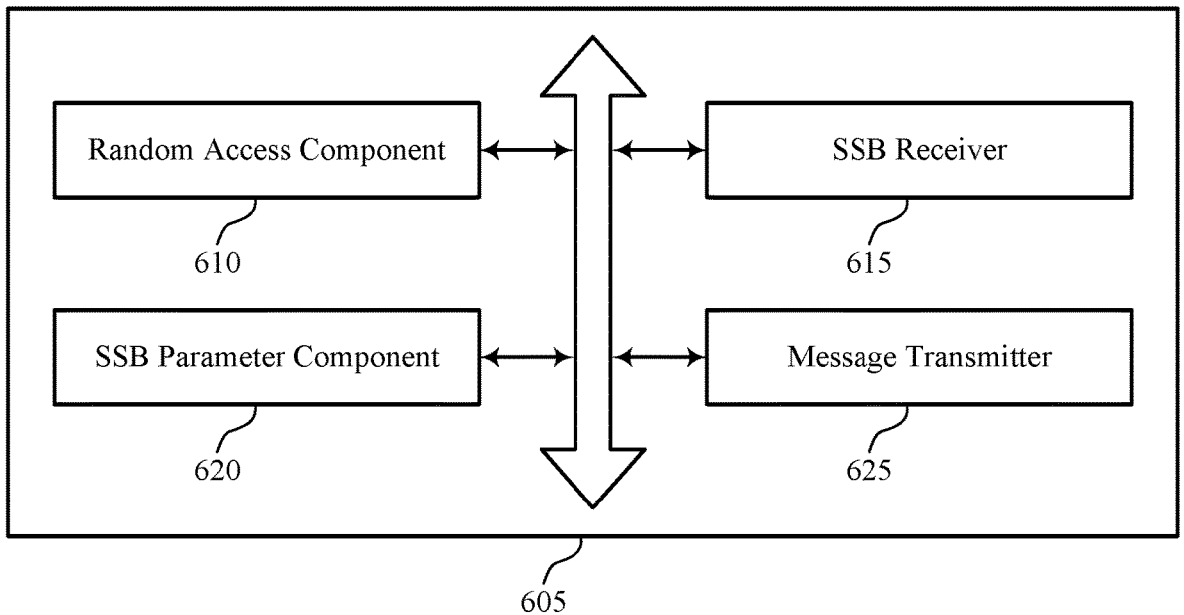
FIG. 6 shows a block diagram of a communications manager that supports resource selection for random access in accordance with aspects of the present disclosure.

FIG. 6 shows a block diagram 600 of a communications manager 605 that supports resource selection for random access in accordance with aspects of the present disclosure. The communications manager 605 may be an example of aspects of a communications manager 415, a communications manager 515, or a communications manager 710 described herein. The communications manager 605 may include a random access component 610, a SSB receiver 615, a SSB parameter component 620, and a message transmitter 625. Each of these modules may communicate, directly or indirectly, with one another (e.g., via one or more buses).

The random access component 610 may determine to perform a random access procedure with a base station.

In some examples, the random access component 610 may monitor, on a received beam that is based on the random access occasion selected to transmit the first message of the random access procedure, for a message 2 of the four-step random access procedure or for a message B of the two-step random access procedure.

The SSB receiver 615 may receive a set of synchronization signal blocks of a set of synchronization signal blocks, where each random access occasion of a set of random access occasions corresponds to at least one synchronization signal block of the set of synchronization signal blocks.

The SSB parameter component 620 may determine, for each synchronization signal block of the set of synchronization signal blocks, a received power and a value of one or more additional parameters for random access occasion selection.

In some examples, the SSB parameter component 620 may select, based on the received power and the value of the congestion parameter associated with a synchronization signal block of the set of synchronization signal blocks, the random access occasion corresponding to the synchronization signal block.

In some examples, the SSB parameter component 620 may determine the value of the congestion parameter based on a backoff indication, a number of contention resolution failures, a number of media access control subheaders, or a combination thereof.

In some examples, the SSB parameter component 620 may select the random access occasion based on the received power and the value of the congestion parameter.

In some examples, the SSB parameter component 620 may determine that the received power reduced by the value of the congestion parameter for the synchronization signal block is greater than each other received power reduced by a corresponding value of the congestion parameter for each other synchronization signal block of the set of synchronization signal blocks.

In some examples, the SSB parameter component 620 may identify, for each synchronization signal block of the set of synchronization signal blocks, a selection probability value based on the received power and the value of the congestion parameter.

In some examples, the SSB parameter component 620 may select the random access occasion corresponding to the synchronization signal block based on the selection probability value corresponding to the synchronization signal block.

In some examples, the SSB parameter component 620 may identify that a value of the congestion parameter associated with at least one synchronization signal block of the set of synchronization signal blocks has exceeded a threshold value associated with a backoff indication, a number of contention resolution failures, or a combination thereof.

In some examples, the SSB parameter component 620 may exclude the at least one synchronization signal block from selection by the UE based on the identifying.

In some examples, the SSB parameter component 620 may select, based on the received power and the value of the timing parameter associated with the random access occasion corresponding to the synchronization signal block, the random access occasion corresponding to the synchronization signal block.

In some examples, the SSB parameter component 620 may exclude at least one random access occasion of the set of random access occasions based on determining that the at least one random access occasion exceeds a latency threshold for the timing parameter.

In some examples, the SSB parameter component 620 may determine two or more synchronization signal blocks of the set of synchronization signal blocks associated with a received power that satisfies a received power threshold.

In some examples, the SSB parameter component 620 may identify two or more random access occasions corresponding to the two or more synchronization signal blocks.

In some examples, the SSB parameter component 620 may select the random access occasion from the two or more random access occasions based on the random access occasion being closest in time, the value of the timing parameter corresponding to the random access occasion being the closest in time.

In some examples, the SSB parameter component 620 may select, based on the received power and the value of the beam correspondence parameter associated with the random access occasion corresponding to the synchronization signal block, the random access occasion corresponding to the synchronization signal block.

In some examples, the SSB parameter component 620 may exclude at least one synchronization signal block of the set of synchronization signal blocks from selection by the UE based on identifying that the UE previously failed to receive a random access response from the base station using a BPL associated with the least one synchronization signal block.

In some examples, the SSB parameter component 620 may determine that the value of the beam correspondence parameter for the synchronization signal block corresponding to the random access occasion exceeds each other value of the beam correspondence parameter for each other synchronization signal block of the set of synchronization signal blocks.

In some examples, the SSB parameter component 620 may select the random access occasion corresponding to a synchronization signal block of the set of synchronization signal blocks based on the received power and the value of the congestion parameter associated with the synchronization signal block.

In some cases, the BPL history parameter indicates that the synchronization signal block is associated with a BPL previously established between the UE and the base station.

In some cases, the BPL history parameter indicates that the synchronization signal block is associated with a BPL that has failed fewer than a threshold number of times.

In some cases, the one of more additional parameters include a congestion parameter, a latency parameter, a beam correspondence parameter, a BPL parameter, or a combination thereof.

The message transmitter 625 may transmit, to the base station, a first message of the random access procedure in a random access occasion selected from the set of random access occasions based on the received power and the value of the one or more additional parameters.

Figure 7:
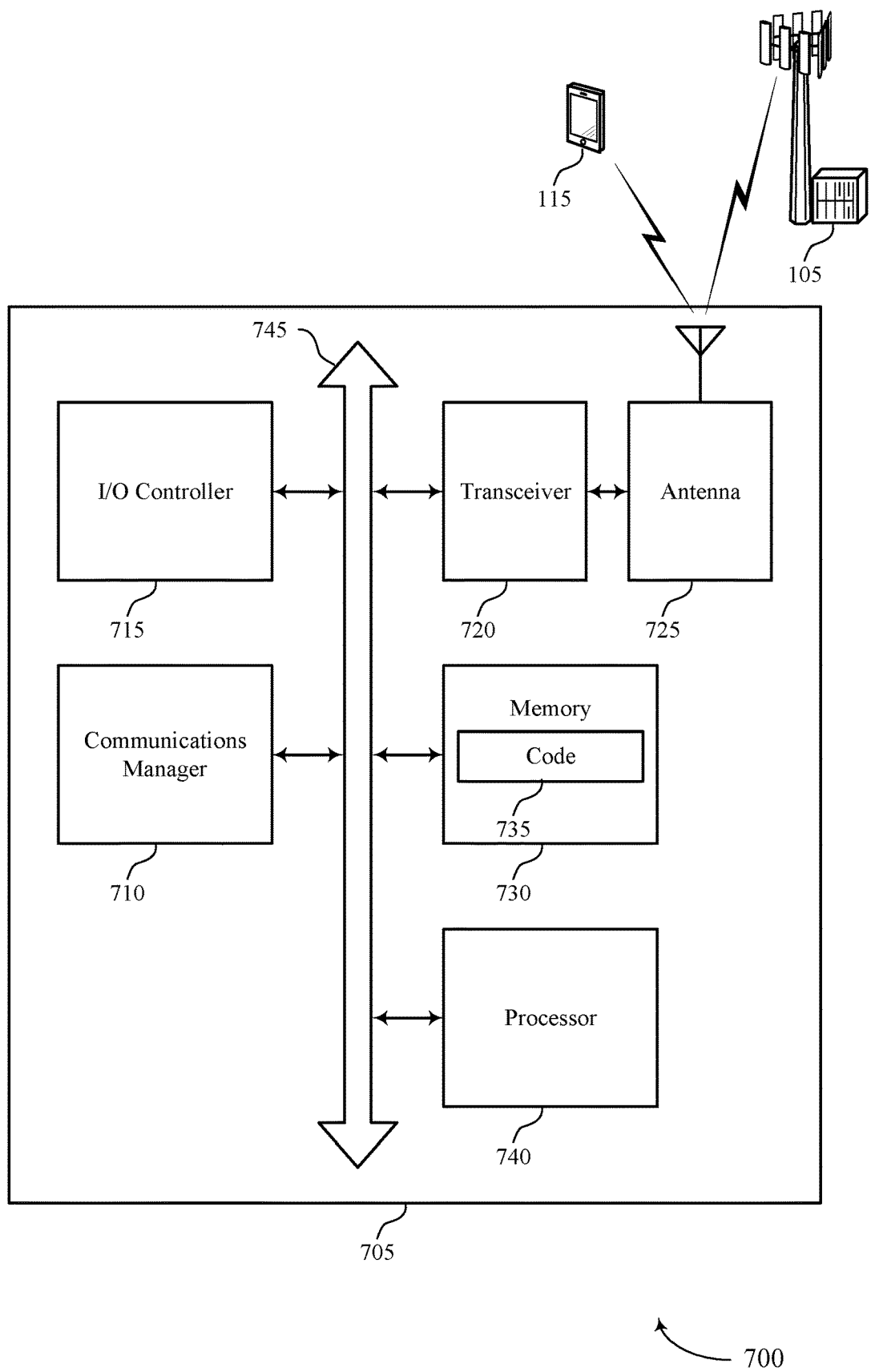
FIG. 7 shows a diagram of a system including a device that supports resource selection for random access in accordance with aspects of the present disclosure.

FIG. 7 shows a diagram of a system 700 including a device 705 that supports resource selection for random access in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may determine to perform a random access procedure with a base station, receive a set of synchronization signal blocks of a set of synchronization signal blocks, where each random access occasion of a set of random access occasions corresponds to at least one synchronization signal block of the set of synchronization signal blocks, determine, for each synchronization signal block of the set of synchronization signal blocks, a received power and a value of one or more additional parameters for random access occasion selection, and transmit, to the base station, a first message of the random access procedure in a random access occasion selected from the set of random access occasions based on the received power and the value of the one or more additional parameters.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting resource selection for random access).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
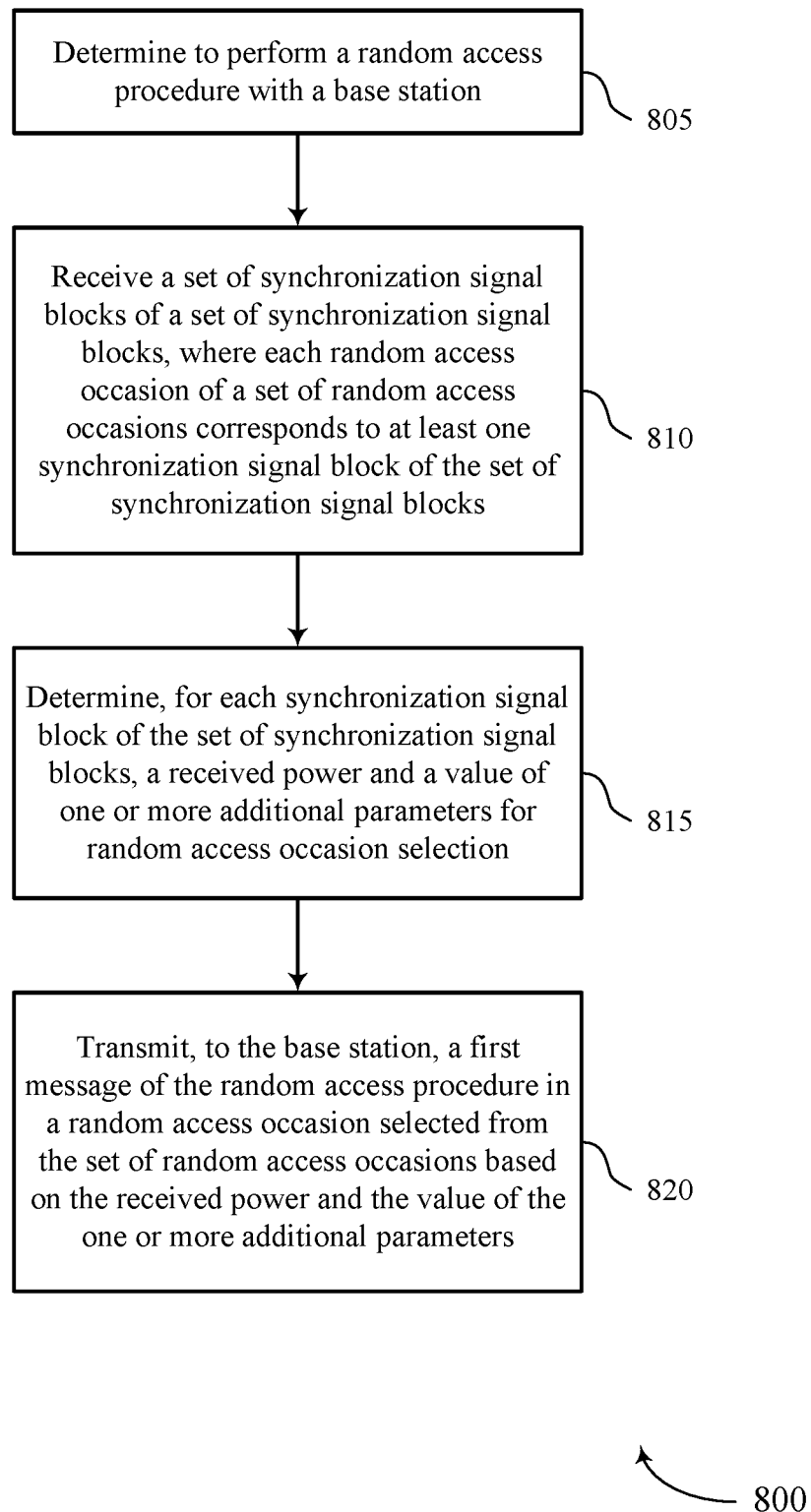
FIGS. 8 through 12 show flowcharts illustrating methods that support resource selection for random access in accordance with aspects of the present disclosure.

FIG. 8 shows a flowchart illustrating a method 800 that supports resource selection for random access in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 805, the UE may determine to perform a random access procedure with a base station. The operations of 805 may be performed according to the methods described herein. In some examples, aspects of the operations of 805 may be performed by a random access component as described with reference to FIGS. 4 through 7.

At 810, the UE may receive a set of synchronization signal blocks of a set of synchronization signal blocks, where each random access occasion of a set of random access occasions corresponds to at least one synchronization signal block of the set of synchronization signal blocks. The operations of 810 may be performed according to the methods described herein. In some examples, aspects of the operations of 810 may be performed by a SSB receiver as described with reference to FIGS. 4 through 7.

At 815, the UE may determine, for each synchronization signal block of the set of synchronization signal blocks, a received power and a value of one or more additional parameters for random access occasion selection. The operations of 815 may be performed according to the methods described herein. In some examples, aspects of the operations of 815 may be performed by a SSB parameter component as described with reference to FIGS. 4 through 7.

At 820, the UE may transmit, to the base station, a first message of the random access procedure in a random access occasion selected from the set of random access occasions based on the received power and the value of the one or more additional parameters. The operations of 820 may be performed according to the methods described herein. In some examples, aspects of the operations of 820 may be performed by a message transmitter as described with reference to FIGS. 4 through 7.

Figure 9:
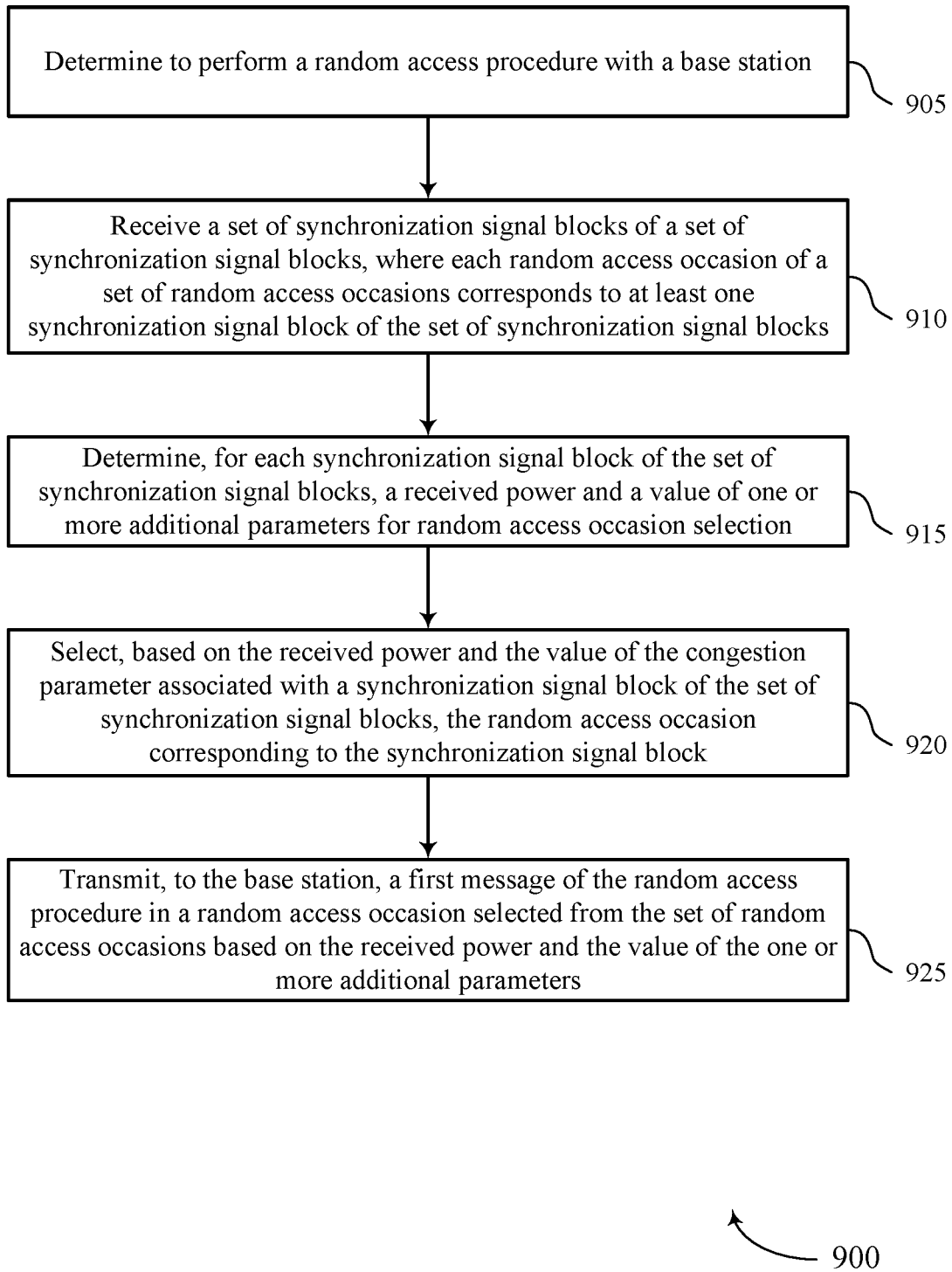

FIG. 9 shows a flowchart illustrating a method 900 that supports resource selection for random access in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 905, the UE may determine to perform a random access procedure with a base station. The operations of 905 may be performed according to the methods described herein. In some examples, aspects of the operations of 905 may be performed by a random access component as described with reference to FIGS. 4 through 7.

At 910, the UE may receive a set of synchronization signal blocks of a set of synchronization signal blocks, where each random access occasion of a set of random access occasions corresponds to at least one synchronization signal block of the set of synchronization signal blocks. The operations of 910 may be performed according to the methods described herein. In some examples, aspects of the operations of 910 may be performed by a SSB receiver as described with reference to FIGS. 4 through 7.

At 915, the UE may determine, for each synchronization signal block of the set of synchronization signal blocks, a received power and a value of one or more additional parameters for random access occasion selection. The operations of 915 may be performed according to the methods described herein. In some examples, aspects of the operations of 915 may be performed by a SSB parameter component as described with reference to FIGS. 4 through 7.

At 920, the UE may select, based on the received power and the value of the congestion parameter associated with a synchronization signal block of the set of synchronization signal blocks, the random access occasion corresponding to the synchronization signal block. The operations of 920 may be performed according to the methods described herein. In some examples, aspects of the operations of 920 may be performed by a SSB parameter component as described with reference to FIGS. 4 through 7.

At 925, the UE may transmit, to the base station, a first message of the random access procedure in a random access occasion selected from the set of random access occasions based on the received power and the value of the one or more additional parameters. The operations of 925 may be performed according to the methods described herein. In some examples, aspects of the operations of 925 may be performed by a message transmitter as described with reference to FIGS. 4 through 7.

Figure 10:
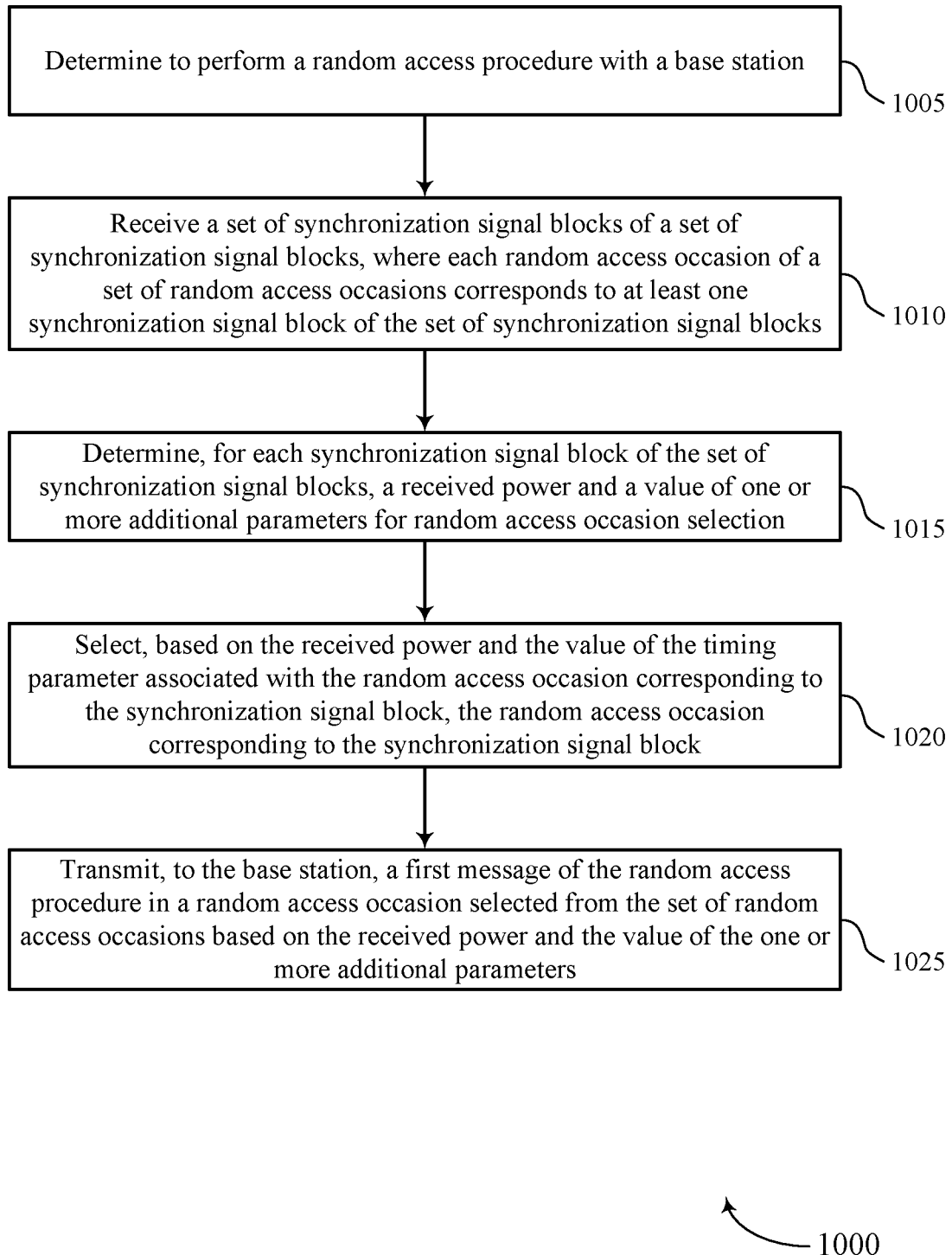

FIG. 10 shows a flowchart illustrating a method 1000 that supports resource selection for random access in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1005, the UE may determine to perform a random access procedure with a base station. The operations of 1005 may be performed according to the methods described herein. In some examples, aspects of the operations of 1005 may be performed by a random access component as described with reference to FIGS. 4 through 7.

At 1010, the UE may receive a set of synchronization signal blocks of a set of synchronization signal blocks, where each random access occasion of a set of random access occasions corresponds to at least one synchronization signal block of the set of synchronization signal blocks. The operations of 1010 may be performed according to the methods described herein. In some examples, aspects of the operations of 1010 may be performed by a SSB receiver as described with reference to FIGS. 4 through 7.

At 1015, the UE may determine, for each synchronization signal block of the set of synchronization signal blocks, a received power and a value of one or more additional parameters for random access occasion selection. The operations of 1015 may be performed according to the methods described herein. In some examples, aspects of the operations of 1015 may be performed by a SSB parameter component as described with reference to FIGS. 4 through 7.

At 1020, the UE may select, based on the received power and the value of the timing parameter associated with the random access occasion corresponding to the synchronization signal block, the random access occasion corresponding to the synchronization signal block. The operations of 1020 may be performed according to the methods described herein. In some examples, aspects of the operations of 1020 may be performed by a SSB parameter component as described with reference to FIGS. 4 through 7.

At 1025, the UE may transmit, to the base station, a first message of the random access procedure in a random access occasion selected from the set of random access occasions based on the received power and the value of the one or more additional parameters. The operations of 1025 may be performed according to the methods described herein. In some examples, aspects of the operations of 1025 may be performed by a message transmitter as described with reference to FIGS. 4 through 7.

Figure 11:
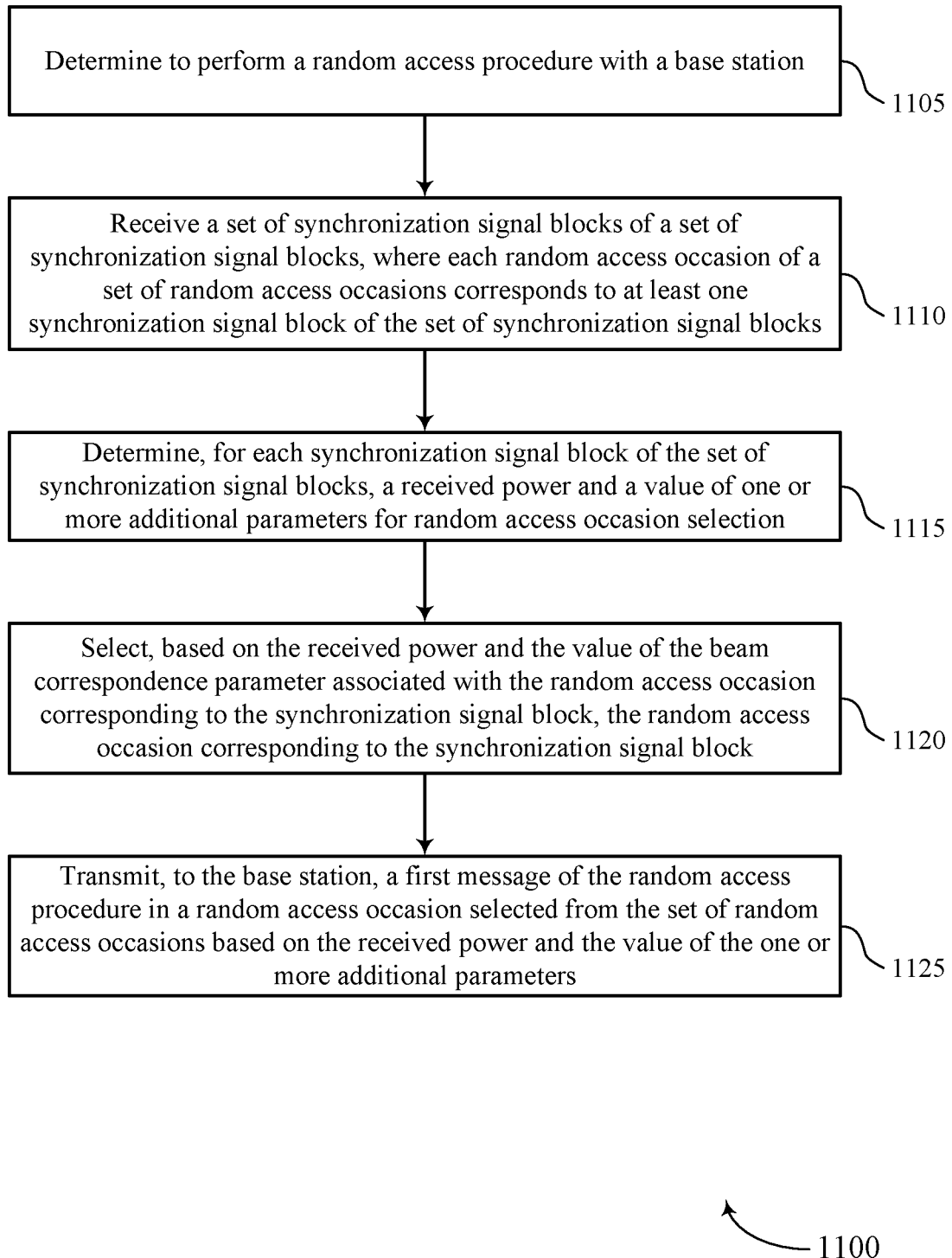

FIG. 11 shows a flowchart illustrating a method 1100 that supports resource selection for random access in accordance with aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1105, the UE may determine to perform a random access procedure with a base station. The operations of 1105 may be performed according to the methods described herein. In some examples, aspects of the operations of 1105 may be performed by a random access component as described with reference to FIGS. 4 through 7.

At 1110, the UE may receive a set of synchronization signal blocks of a set of synchronization signal blocks, where each random access occasion of a set of random access occasions corresponds to at least one synchronization signal block of the set of synchronization signal blocks. The operations of 1110 may be performed according to the methods described herein. In some examples, aspects of the operations of 1110 may be performed by a SSB receiver as described with reference to FIGS. 4 through 7.

At 1115, the UE may determine, for each synchronization signal block of the set of synchronization signal blocks, a received power and a value of one or more additional parameters for random access occasion selection. The operations of 1115 may be performed according to the methods described herein. In some examples, aspects of the operations of 1115 may be performed by a SSB parameter component as described with reference to FIGS. 4 through 7.

At 1120, the UE may select, based on the received power and the value of the beam correspondence parameter associated with the random access occasion corresponding to the synchronization signal block, the random access occasion corresponding to the synchronization signal block. The operations of 1120 may be performed according to the methods described herein. In some examples, aspects of the operations of 1120 may be performed by a SSB parameter component as described with reference to FIGS. 4 through 7.

At 1125, the UE may transmit, to the base station, a first message of the random access procedure in a random access occasion selected from the set of random access occasions based on the received power and the value of the one or more additional parameters. The operations of 1125 may be performed according to the methods described herein. In some examples, aspects of the operations of 1125 may be performed by a message transmitter as described with reference to FIGS. 4 through 7.

Figure 12:
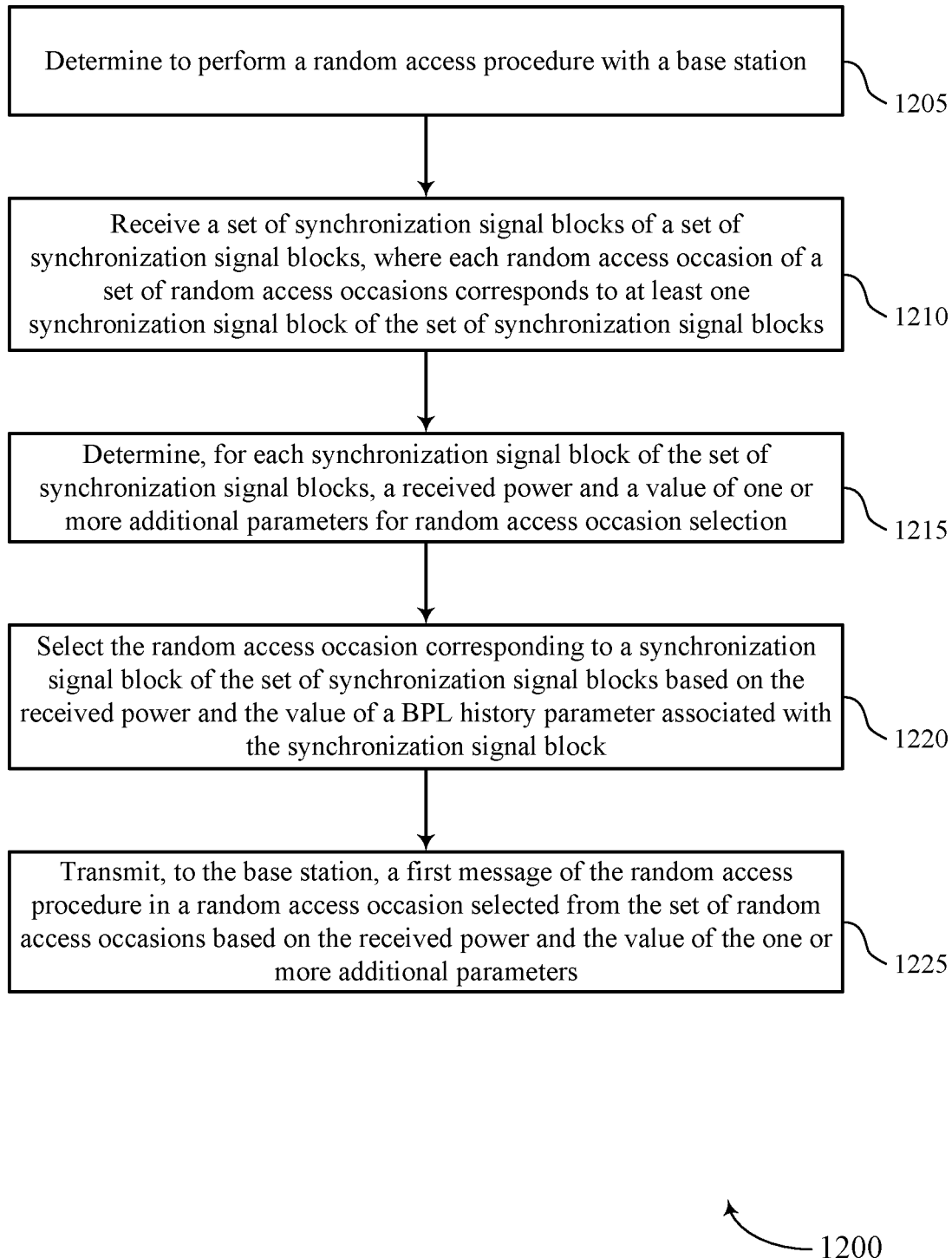

FIG. 12 shows a flowchart illustrating a method 1200 that supports resource selection for random access in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may determine to perform a random access procedure with a base station. The operations of 1205 may be performed according to the methods described herein. In some examples, aspects of the operations of 1205 may be performed by a random access component as described with reference to FIGS. 4 through 7.

At 1210, the UE may receive a set of synchronization signal blocks of a set of synchronization signal blocks, where each random access occasion of a set of random access occasions corresponds to at least one synchronization signal block of the set of synchronization signal blocks. The operations of 1210 may be performed according to the methods described herein. In some examples, aspects of the operations of 1210 may be performed by a SSB receiver as described with reference to FIGS. 4 through 7.

At 1215, the UE may determine, for each synchronization signal block of the set of synchronization signal blocks, a received power and a value of one or more additional parameters for random access occasion selection. The operations of 1215 may be performed according to the methods described herein. In some examples, aspects of the operations of 1215 may be performed by a SSB parameter component as described with reference to FIGS. 4 through 7.

At 1220, the UE may select the random access occasion corresponding to a synchronization signal block of the set of synchronization signal blocks based on the received power and a value of the beam link pair history parameter associated with the synchronization signal block. The operations of 1220 may be performed according to the methods described herein. In some examples, aspects of the operations of 1220 may be performed by a SSB parameter component as described with reference to FIGS. 4 through 7.

At 1225, the UE may transmit, to the base station, a first message of the random access procedure in a random access occasion selected from the set of random access occasions based on the received power and the value of the one or more additional parameters. The operations of 1225 may be performed according to the methods described herein. In some examples, aspects of the operations of 1225 may be performed by a message transmitter as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    determining to perform a random access procedure with a base station;
    receiving a plurality of synchronization signal blocks of a set of synchronization signal blocks, wherein each random access occasion of a set of random access occasions corresponds to at least one synchronization signal block of the set of synchronization signal blocks;
    determining, for at least one synchronization signal block of the plurality of synchronization signal blocks, a received power and a value of one or more additional parameters for random access occasion selection, wherein the one or more additional parameters comprise a congestion parameter for a first synchronization signal block of the plurality of synchronization signal blocks;
    determining a value of the congestion parameter based at least in part on a backoff indication from the base station, a quantity of contention resolution failures, a quantity of medium access control subheaders in a random access response, or any combination thereof; and
    transmitting, to the base station, a first message of the random access procedure in a random access occasion selected from the set of random access occasions, wherein the random access occasion is selected based at least in part on the received power and the value of the congestion parameter.

2. The method of claim 1 further comprising:
    selecting, based at least in part on the received power and the value of the congestion parameter associated with the first synchronization signal block of the plurality of synchronization signal blocks, the random access occasion corresponding to the first synchronization signal block.

3. The method of claim 2, wherein selecting the random access occasion based at least in part on the received power and the value of the congestion parameter comprises:
    selecting the random access occasion based at least in part on the received power and the value of the congestion parameter.

4. The method of claim 2, wherein selecting the random access occasion corresponding to the first synchronization signal block comprises:
    determining that the received power reduced by the value of the congestion parameter for the first synchronization signal block is greater than each other received power reduced by a corresponding value of the congestion parameter for each other synchronization signal block of the plurality of synchronization signal blocks.

5. The method of claim 2, wherein selecting the random access occasion corresponding to the first synchronization signal block comprises:
identifying, for each synchronization signal block of the plurality of synchronization signal blocks, a selection probability value based at least in part on the received power and the value of the congestion parameter; and
selecting the random access occasion corresponding to the first synchronization signal block based at least in part on the selection probability value corresponding to the first synchronization signal block.

6. The method of claim 2, wherein selecting the random access occasion corresponding to the first synchronization signal block comprises:
identifying that a value of the congestion parameter associated with at least one second synchronization signal block of the plurality of synchronization signal blocks has exceeded a threshold value associated with the backoff indication, the quantity of contention resolution failures, or a combination thereof, and
excluding the at least one second synchronization signal block from selection by the UE based at least in part on the identifying.

7. The method of claim 1, wherein the one or more additional parameters comprises a timing parameter, the method further comprising:
selecting, based at least in part on the received power and the value of the timing parameter associated with the random access occasion corresponding to the first synchronization signal block, the random access occasion corresponding to the first synchronization signal block.

8. The method of claim 7, wherein selecting the random access occasion corresponding to the first synchronization signal block comprises:
excluding at least one random access occasion of the set of random access occasions based at least in part on determining that the at least one random access occasion exceeds a latency threshold for the timing parameter.

9. The method of claim 7, wherein selecting the random access occasion corresponding to the first synchronization signal block comprises:
determining two or more synchronization signal blocks of the plurality of synchronization signal blocks associated with a received power that satisfies a received power threshold;
identifying two or more random access occasions corresponding to the two or more synchronization signal blocks; and
selecting the random access occasion from the two or more random access occasions based at least in part on the random access occasion being closest in time, the value of the timing parameter corresponding to the random access occasion being the closest in time.

10. The method of claim 1, wherein the one or more additional parameters comprises a beam correspondence parameter, the method further comprising:
selecting, based at least in part on the received power and the value of the beam correspondence parameter associated with the random access occasion corresponding to the first synchronization signal block, the random access occasion corresponding to the first synchronization signal block.

11. The method of claim 10, further comprising:
excluding at least one second synchronization signal block of the plurality of synchronization signal blocks from selection by the UE based at least in part on identifying that the UE previously failed to receive a random access response from the base station using a beam pair link associated with the at least one second synchronization signal block.

12. The method of claim 10, wherein selecting the random access occasion corresponding to the first synchronization signal block comprises:
determining that the value of the beam correspondence parameter for the first synchronization signal block corresponding to the random access occasion exceeds each other value of the beam correspondence parameter for each other synchronization signal block of the plurality of synchronization signal blocks.

13. The method of claim 1, wherein the one or more additional parameters comprises a beam pair link history parameter for the first synchronization signal block, the method further comprising:
selecting the random access occasion corresponding to the first synchronization signal block of the plurality of synchronization signal blocks based at least in part on the received power and the value of the beam pair link history parameter associated with the first synchronization signal block.

14. The method of claim 13, wherein the beam pair link history parameter indicates that the first synchronization signal block is associated with a beam pair link previously established between the UE and the base station.

15. The method of claim 13, wherein the beam pair link history parameter indicates that the first synchronization signal block is associated with a beam pair link that has failed fewer than a threshold number of times.

16. The method of claim 1, wherein the first message of the random access procedure comprises a message 1 of a four-step random access procedure or a message A of a two-step random access procedure, the method further comprising:
monitoring, on a received beam that is based at least in part on the random access occasion selected to transmit the first message of the random access procedure, for a message 2 of the four-step random access procedure or for a message B of the two-step random access procedure.

17. An apparatus for wireless communication at a user equipment (UE), comprising:
one or more processors,
one or more memories coupled with the one or more processors; and
instructions stored in the one or more memories and executable by the one or more processors to cause the apparatus to:
determine to perform a random access procedure with a base station;
receive a plurality of synchronization signal blocks of a set of synchronization signal blocks, wherein each random access occasion of a set of random access occasions corresponds to at least one synchronization signal block of the set of synchronization signal blocks;
determine, for at least one synchronization signal block of the plurality of synchronization signal blocks, a received power and a value of one or more additional parameters for random access occasion selection, wherein the one or more additional parameters comprise a congestion parameter for a first synchronization signal block of the plurality of synchronization signal blocks;

determine a value of the congestion parameter based at least in part on a backoff indication from the base station, a quantity of contention resolution failures, a quantity of medium access control subheaders in a random access response, or any combination thereof; and transmit, to the base station, a first message of the random access procedure in a random access occasion selected from the set of random access occasions, wherein the random access occasion is selected based at least in part on the received power and the value of the congestion parameter.

18. The apparatus of claim 17, the instructions are further executable by the one or more processors to cause the apparatus to:

select, based at least in part on the received power and the value of the congestion parameter associated with the first synchronization signal block of the plurality of synchronization signal blocks, the random access occasion corresponding to the first synchronization signal block.

19. The apparatus of claim 17, wherein the one or more additional parameters comprises a timing parameter, and the instructions are further executable by the one or more processors to cause the apparatus to:

select, based at least in part on the received power and the value of the timing parameter associated with the random access occasion corresponding to the first synchronization signal block, the random access occasion corresponding to the first synchronization signal block.

20. The apparatus of claim 17, wherein the one or more additional parameters comprises a beam correspondence parameter, and the instructions are further executable by the one or more processors to cause the apparatus to:

select, based at least in part on the received power and the value of the beam correspondence parameter associated with the random access occasion corresponding to the first synchronization signal block, the random access occasion corresponding to the first synchronization signal block.

21. The apparatus of claim 17, wherein the one or more additional parameters comprises a beam pair link history parameter for the first synchronization signal block, and the instructions are further executable by the one or more processors to cause the apparatus to:

select the random access occasion corresponding to the first synchronization signal block of the plurality of synchronization signal blocks based at least in part on the received power and the value of the beam pair link history parameter associated with the first synchronization signal block.

22. The apparatus of claim 17, wherein the first message of the random access procedure comprises a message 1 of a four-step random access procedure or a message A of a two-step random access procedure, and the instructions are further executable by the one or more processors to cause the apparatus to:

monitor, on a received beam that is based at least in part on the random access occasion selected to transmit the first message of the random access procedure, for a message 2 of the four-step random access procedure or for a message B of the two-step random access procedure.

23. An apparatus for wireless communication at a user equipment (UE), comprising:

means for determining to perform a random access procedure with a base station;

means for receiving a plurality of synchronization signal blocks of a set of synchronization signal blocks, wherein each random access occasion of a set of random access occasions corresponds to at least one synchronization signal block of the set of synchronization signal blocks;

means for determining, for at least one synchronization signal block of the plurality of synchronization signal blocks, a received power and a value of one or more additional parameters for random access occasion selection, wherein the one or more additional parameters comprise a congestion parameter for a first synchronization signal block of the plurality of synchronization signal blocks;

means for determining a value of the congestion parameter based at least in part on a backoff indication from the base station, a quantity of contention resolution failures, a quantity of medium access control subheaders in a random access response, or any combination thereof; and means for transmitting, to the base station, a first message of the random access procedure in a random access occasion from the set of random access occasions, wherein the random access occasion is selected based at least in part on the received power and the value of the congestion parameter, wherein the first message comprises a message 1 of a four-step random access procedure or a message A of a two-step random access procedure.

24. The apparatus of claim 23, further comprising:

means for selecting, based at least in part on the received power and the value of the congestion parameter associated with the first synchronization signal block of the plurality of synchronization signal blocks, the random access occasion corresponding to the first synchronization signal block.

25. The apparatus of claim 23, wherein the one or more additional parameters comprises a timing parameter, the apparatus further comprising:

means for selecting, based at least in part on the received power and the value of the timing parameter associated with the random access occasion corresponding to the first synchronization signal block, the random access occasion corresponding to the first synchronization signal block.

26. The apparatus of claim 23, wherein the one or more additional parameters comprises a beam correspondence parameter, the apparatus further comprising:

means for selecting, based at least in part on the received power and the value of the beam correspondence parameter associated with the random access occasion corresponding to the first synchronization signal block, the random access occasion corresponding to the first synchronization signal block.

27. The apparatus of claim 23, wherein the one or more additional parameters comprises a beam pair link history parameter for the first synchronization signal block, the apparatus further comprising:

means for selecting the random access occasion corresponding to the first synchronization signal block of the plurality of synchronization signal blocks based at least in part on the received power and the value of the congestion parameter associated with the first synchronization signal block.

28. A non-transitory computer-readable medium storing code for wireless communication at a user equipment (UE), the code comprising instructions executable by one or more processors to:

determine to perform a random access procedure with a base station;

receive a plurality of synchronization signal blocks of a set of synchronization signal blocks, wherein each random access occasion of a set of random access occasions corresponds to at least one synchronization signal block of the set of synchronization signal blocks;

determine, for at least one synchronization signal block of the plurality of synchronization signal blocks, a received power and a value of one or more additional parameters for random access occasion selection, wherein the one or more additional parameters comprise a congestion parameter for a first synchronization signal block of the plurality of synchronization signal blocks;

determine a value of the congestion parameter based at least in part on a backoff indication from the base station, a quantity of contention resolution failures, a quantity of medium access control subheaders in a random access response, or any combination thereof; and transmit, to the base station, a first message of the random access procedure in a random access occasion from the set of random access occasions, wherein the random access occasion is selected based at least in part on the received power and the value of the congestion parameter, wherein the first message comprises a message 1 of a four-step random access procedure or a message A of a two-step random access procedure.

29. The method of claim 1, wherein a soft preference associated with the congestion parameter is based at least in part on the backoff indication, the quantity of contention resolution failures, the quantity of medium access control subheaders in the random access response, or a combination thereof.

30. The apparatus of claim 17, wherein a soft preference associated with the congestion parameter is based at least in part on the backoff indication, the quantity of contention resolution failures, the quantity of medium access control subheaders in the random access response, or a combination thereof.

* * * * *